United States Patent
Sivakumar

(10) Patent No.: US 7,116,672 B1
(45) Date of Patent: Oct. 3, 2006

(54) METHOD AND APPARATUS FOR REDUCING FLOODING IN BRIDGED NETWORKS

(75) Inventor: Senthil Sivakumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/545,272

(22) Filed: Apr. 7, 2000

(51) Int. Cl.
H04L 12/56 (2006.01)

(52) U.S. Cl. .................. 370/395.4; 370/468

(58) Field of Classification Search ............. 370/401, 370/402, 403, 404, 405, 395.4, 229, 389, 370/392, 312, 390, 468
See application file for complete search history.

(56) References Cited

U.S. PATENT DOCUMENTS

| | | | | |
|---|---|---|---|---|
| 5,210,748 A | * | 5/1993 | Onishi et al. | 370/405 |
| 5,381,413 A | * | 1/1995 | Tobagi et al. | 370/448 |
| 5,539,745 A | * | 7/1996 | Chang et al. | 370/235 |
| 5,596,722 A | * | 1/1997 | Rahnema | 709/241 |
| 5,633,865 A | * | 5/1997 | Short | 370/412 |
| 5,793,954 A | * | 8/1998 | Baker et al. | 709/250 |
| 5,805,594 A | * | 9/1998 | Kotchey et al. | 370/401 |
| 5,809,076 A | * | 9/1998 | Hofmann | 375/257 |
| 6,041,058 A | * | 3/2000 | Flanders et al. | 370/401 |
| 6,081,532 A | * | 6/2000 | Fiammante | 370/401 |
| 6,101,188 A | * | 8/2000 | Sekine et al. | 370/401 |
| 6,111,892 A | * | 8/2000 | Rittle et al. | 370/465 |
| 6,188,691 B1 | * | 2/2001 | Barkai et al. | 370/390 |
| 6,301,257 B1 | * | 10/2001 | Johnson et al. | 370/406 |
| 6,310,874 B1 | * | 10/2001 | Miller et al. | 370/379 |
| 6,535,507 B1 | * | 3/2003 | Li et al. | 370/356 |
| 6,594,272 B1 | * | 7/2003 | Ketcham et al. | 370/428 |

OTHER PUBLICATIONS

Huitema, Christian "Routing in the Internet," Prentice-Hall, Inc. 2000. pp. 165.*

* cited by examiner

*Primary Examiner*—Seema S. Rao
*Assistant Examiner*—Donald L Mills
(74) *Attorney, Agent, or Firm*—Sierra Patent Group, Ltd.

(57) ABSTRACT

A method and apparatus for reducing flooding in a bridged network. The invention generally allows broadcast flooding for a predefined limited time period to permit mapping of a MAC address to a port by the bridge and disallows broadcast flooding for a second predefined time period. After the second time period expires, the process is repeated to allow the bridge to flood the networks for the predefined limited time period again. The bridge allows or disallows broadcasts flooding independently based on the destination MAC address.

12 Claims, 5 Drawing Sheets

METHOD AND APPARATUS FOR REDUCING FLOODING IN BRIDGED NETWORKS

BACKGROUND OF THE INVENTION

1. Field of the Invention

This invention pertains generally to bridged networks. More particularly, the invention is a method and apparatus for reducing flooding in a bridged network.

2. The Prior Art

Bridges are generally used for connecting multiple LANs (local access networks) as is known in the art. Bridges operate in the data link layer of the OSI (Open System Interconnection) reference model. As such, bridges do not examine the network layer header and are thus capable of copying IP, IPX and OSI packets equally well.

Bridges are useful in a plurality of situations, including connecting LANs which are separated by considerable distances and splitting a single LAN into separate LANs to accommodate large bandwidth load, for example. Bridges are also useful for connecting LANs of different types, such as connecting an 802.3 LAN to an 802.4 LAN.

Bridges use source and destination MAC address information to determine how and where to forward packets. For example, in a three-port bridge, the bridge inspects MAC information in a packet to determine which of the three ports to forward the packet to.

In operation, a bridge maintains a "bridge table" containing a mapping from MAC address to port. Initially the bridge table is empty; the bridge adds entries during operation. Typically, when the bridge receives a packet, the bridge inspects the destination MAC address and determines from the bridge table which port to forward the packet to. If the destination MAC address is not associated with an entry/port in the bridge table, the bridge broadcasts (or "floods") each port, thereby forwarding the packet to each port. When a reply is received from the destination node, the bridge determines from which port the reply originated, and establishes the map between the destination MAC address and the port. After this mapping is established, future packets directed at the same destination MAC address are not broadcast to every port, but only to the port which is mapped to the address.

Traditional bridging performance is acceptable in most cases. However, in cases where there is a large amount of traffic on the LANs connected by the bridge, several drawbacks result from excessive flooding of the ports (and therefore the LANs attached to the ports) of the bridge. The primary drawback with excessive flooding is the reduced bandwidth available to other devices on the LANs to the point where, for example, critical applications may not be able to access necessary resources. Other drawbacks from excessive flooding are also known in the art, including, for example, dropped packets.

In addition, where a bridge connects a network over a WAN (wide area network) link, the costs for communicating over the WAN link increase as the number of broadcast flooding communications increase, thereby increasing the cost associated with running the bridged network.

Accordingly, there is a need for a method and apparatus which reduces or controls flooding in bridged networks. The present invention satisfies these needs, as well as others, and generally overcomes the deficiencies found in the background art.

BRIEF DESCRIPTION OF THE INVENTION

The invention is a method and apparatus for controlling flooding in a bridged network. The invention is generally embodied in software executed by the bridge device. The invention further relates to machine readable media on which are stored embodiments of the present invention. It is contemplated that any media suitable for retrieving instructions is within the scope of the present invention. By way of example, such media may take the form of magnetic, optical, or semiconductor media. The invention also relates to data structures that contain embodiments of the present invention, and to the transmission of data structures containing embodiments of the present invention.

According to a first embodiment, the invention allows broadcast flooding for a predefined limited time period to permit mapping the MAC address to a port by the bridge and disallows broadcast flooding for a second predefined time period. After the second time period expires, the process is repeated to allow the bridge to flood the networks for the predefined limited time period again.

The bridge allows or disallows broadcast flooding independently based on the destination MAC address. For example, for a given MAC address the bridge cycles between the period of allowed broadcast flooding and the period of disallowed broadcast flooding. In general, the bridge maintains a "filter table" to manage the task of allowing and disallowing broadcast flooding.

An object of the invention is to provide a method and apparatus for controlling broadcast flooding in a bridged network which overcomes the deficiencies of the prior art.

Another object of the invention is to provide a method and apparatus for controlling broadcast flooding in a bridged network which allows for a limited time period for allowing broadcast flooding and a limited time period for disallowing broadcast flooding.

Further objects and advantages of the invention will be brought out in the following portions of the specification, wherein the detailed description is for the purpose of fully disclosing the preferred embodiment of the invention without placing limitations thereon.

BRIEF DESCRIPTION OF THE DRAWINGS

The present invention will be more fully understood by reference to the following drawings, which are for illustrative purposes only.

DETAILED DESCRIPTION OF THE PREFERRED EMBODIMENTS

Persons of ordinary skill in the art will realize that the following description of the present invention is illustrative only and not in any way limiting. Other embodiments of the invention will readily suggest themselves to such skilled persons having the benefit of this disclosure.

Figure 1:
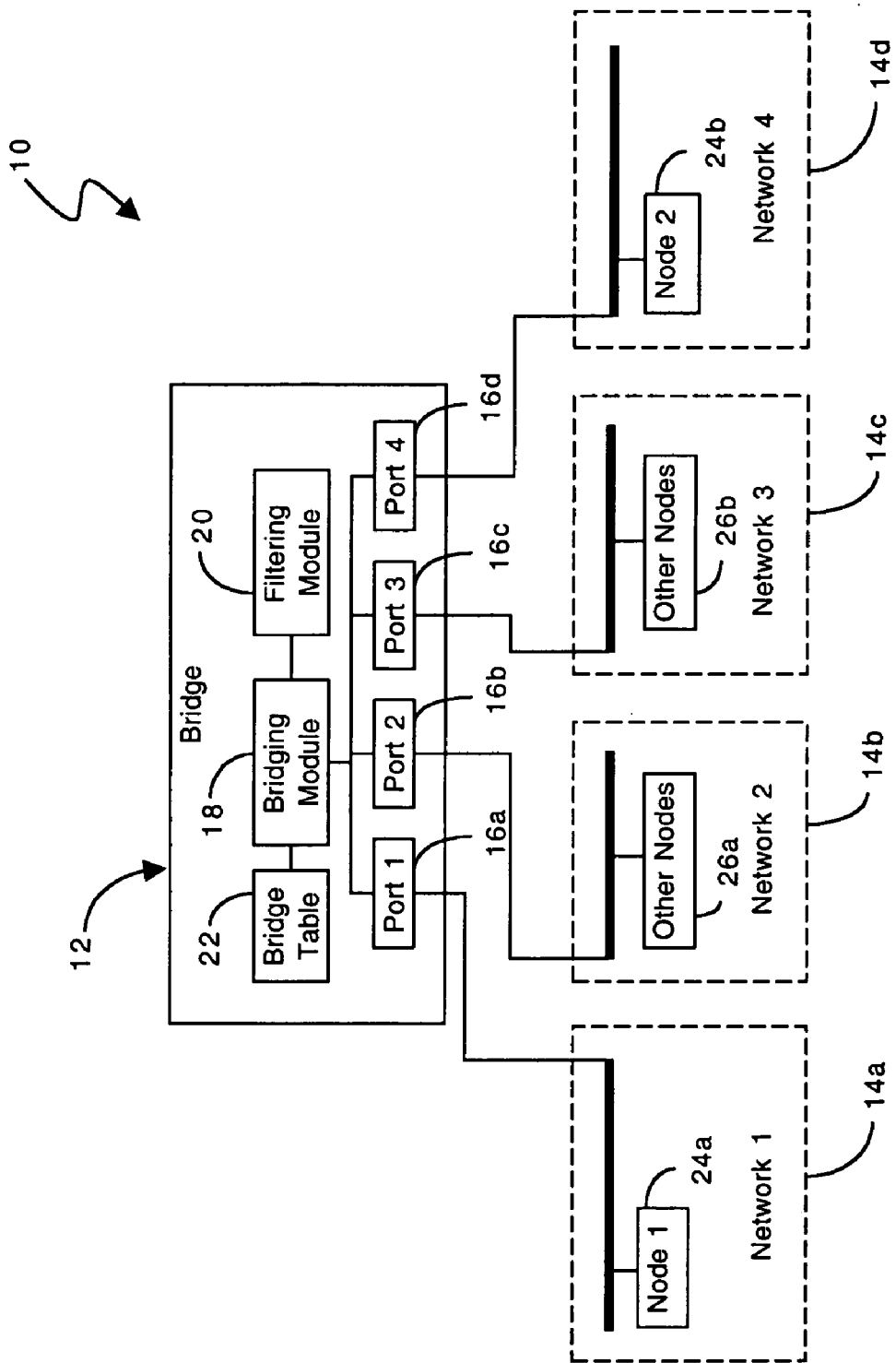
FIG. 1 is a functional block diagram of a bridged network suitable for use with the present invention.
Figure 2:
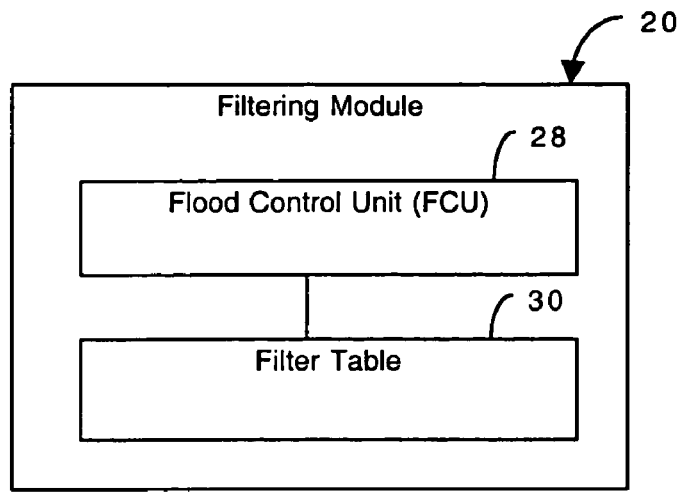
FIG. 2 is a functional block diagram of a filtering module in accordance with the present invention.
Figure 3:
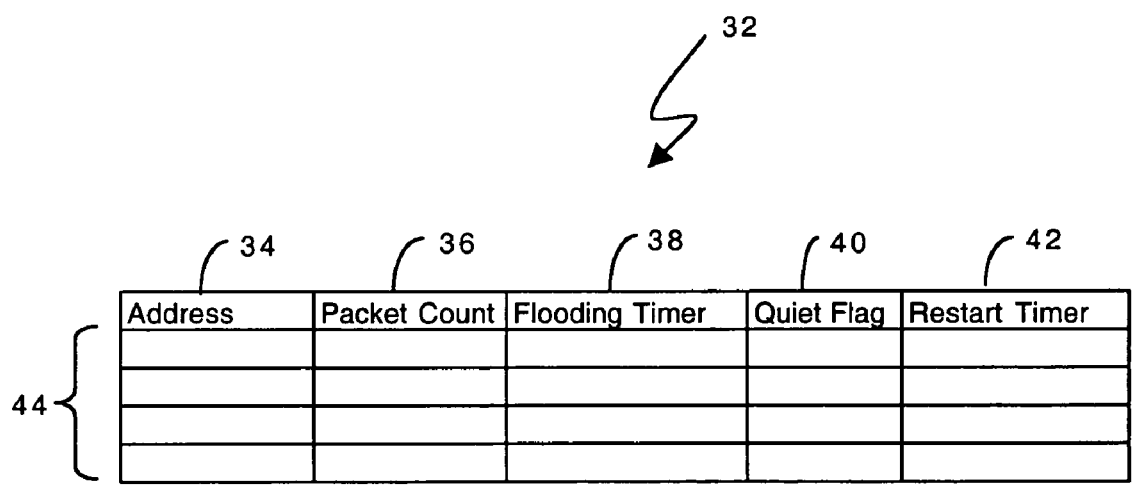
FIG. 3 depicts a exemplary data structure of a filter table suitable for use with the present invention.
Figure 4:
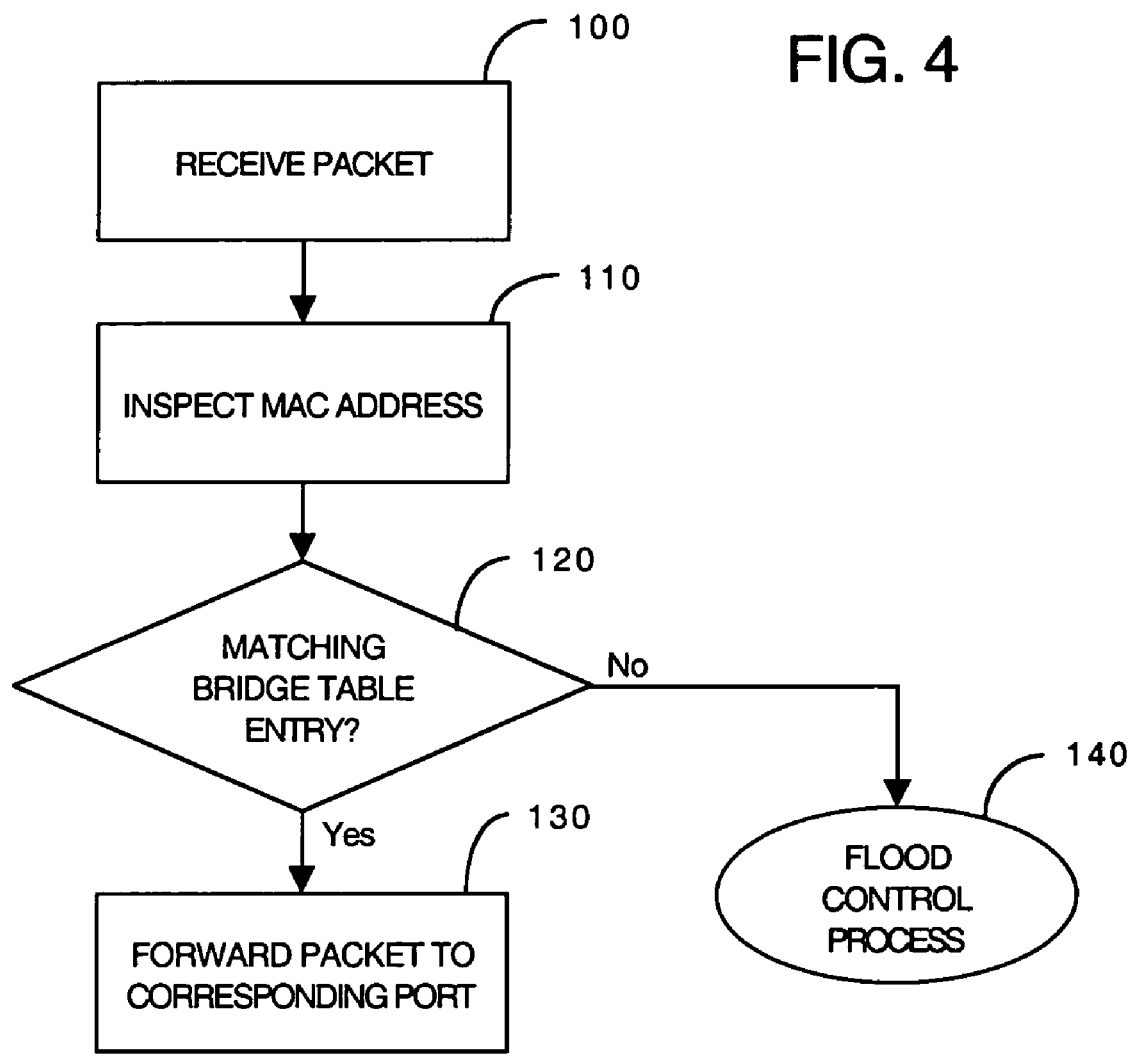
FIG. 4 is a flow chart depicting the acts associated with bridge processing in accordance with the present invention.
Figure 5:
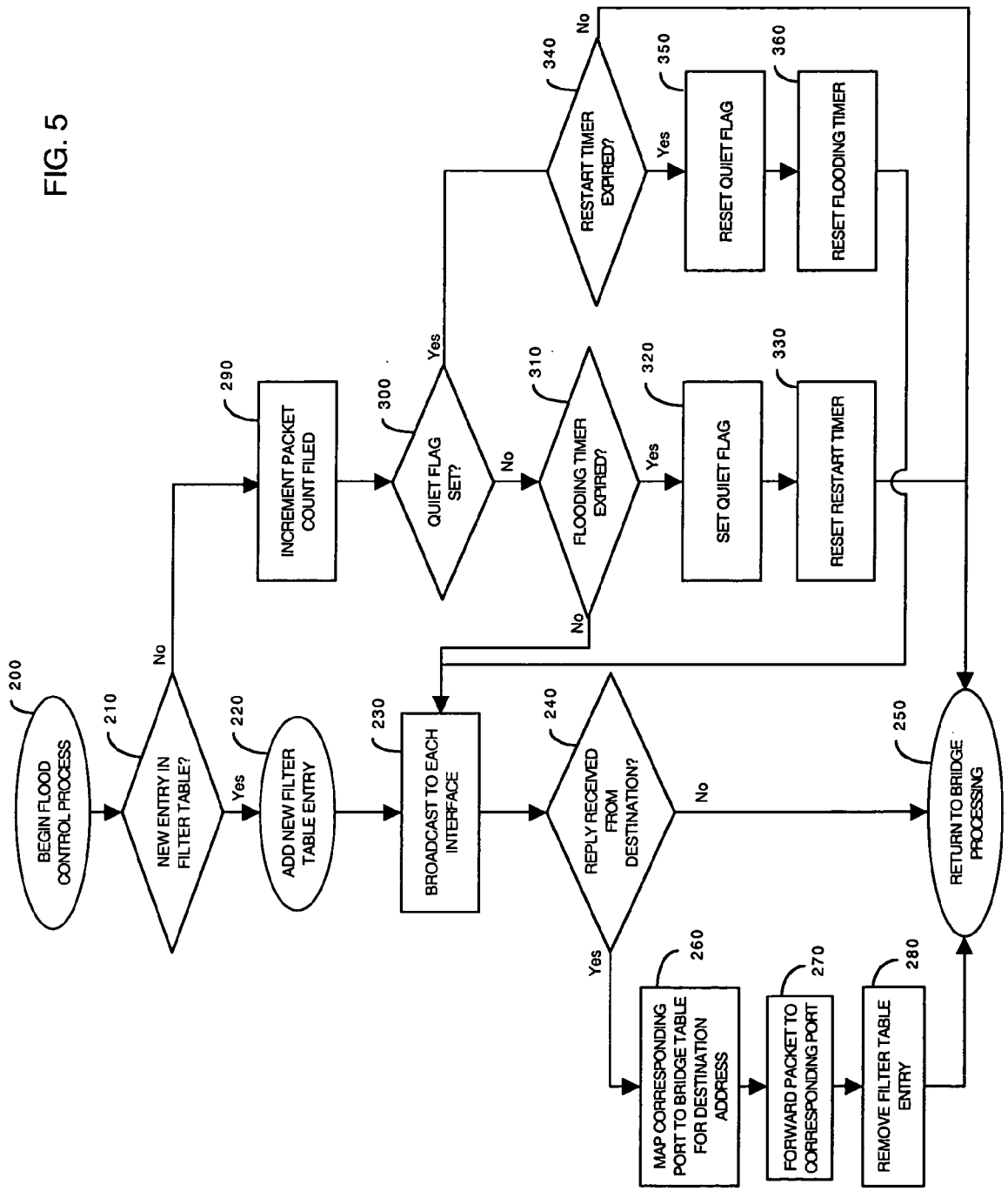
FIG. 5 is a flow chart depicting the acts associated with the flood control process in accordance with the present invention.
Figure 6:
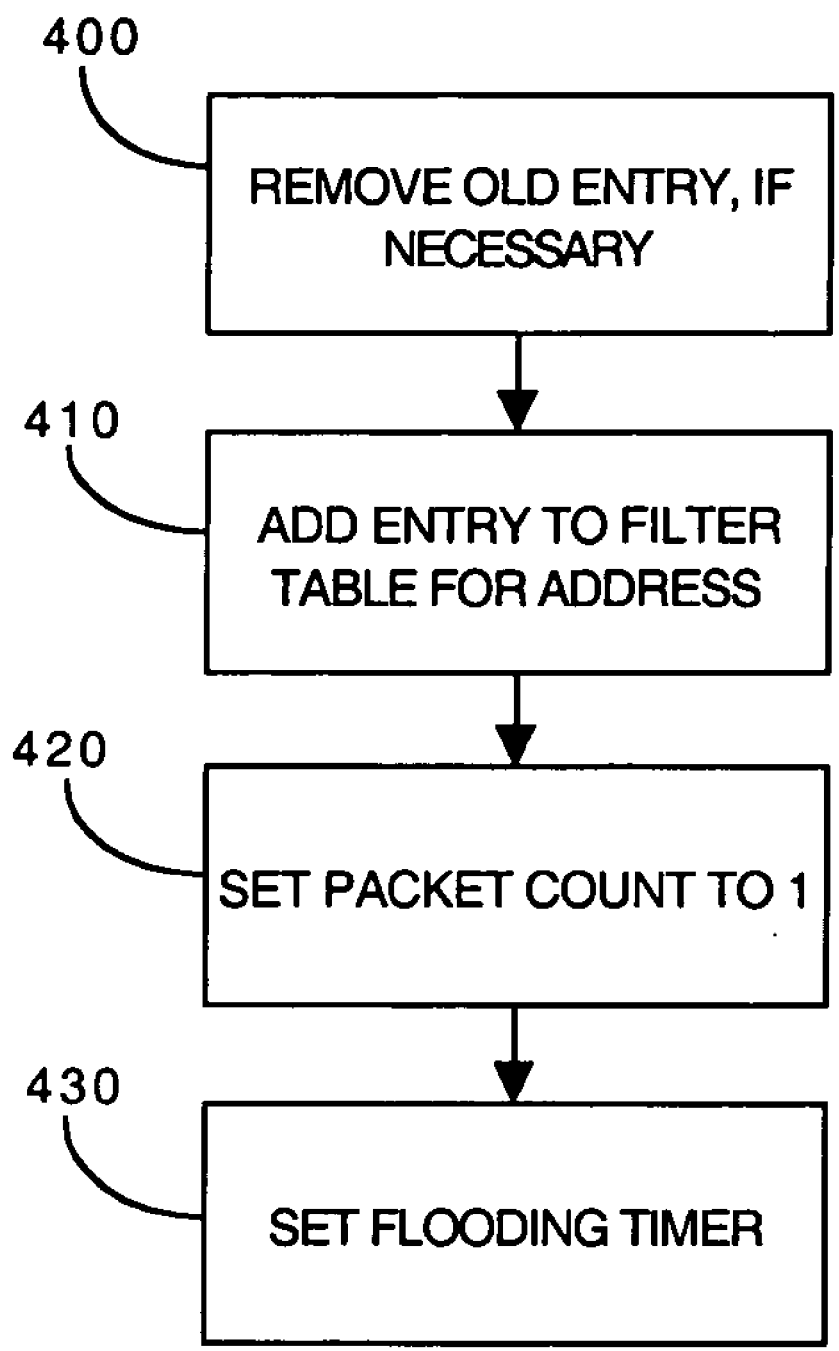
FIG. 6 is a flow chart depicting the acts associated with adding a new filter table entry in accordance with the present invention.

Referring more specifically to the drawings, for illustrative purposes the present invention is embodied in the apparatus shown FIG. 1 through FIG. 3 and the method outlined in FIGS. 4 through 6. It will be appreciated that the apparatus may vary as to configuration and as to details of the parts, and that the method may vary as to details and the order of the acts, without departing from the basic concepts as disclosed herein. The invention is disclosed generally in terms of a system and method for controlling flooding in a bridged network, although numerous other uses for the invention will suggest themselves to persons of ordinary skill in the art.

Referring first to FIG. 1, there is shown a function block diagram of a bridged network 10 suitable for use with the present invention. The bridged network 10 includes a bridge 12 connected to a plurality of networks, identified as network 1 (14a), network 2 (14b), network 3 (14c), and network 4 (14d). Each network comprises one or more nodes. As depicted in FIG. 1, network 1 includes at least one node (24a) and network 4 includes at least one node (24b). Each of networks (2, 3) includes corresponding other nodes (26a, 26b).

The bridge 12 comprises a conventional data processing means or computer, and includes convention hardware components (not shown) such as a processor, a memory, and input/output devices. The bridge further includes a plurality of ports identified as port 1 (16a), port 2 (16b), port 3 (16c), and port 4 (16d). As is known in the art, data packets are communicated and forwarded to the appropriate network (14a through 14d) via a corresponding port (16a through 16d) by the bridge 12. While the illustrative bridged network 12 depicts a bridge with four ports and connected to four networks, it is noted that the present invention is suitable for use with other bridge arrangements and network topologies. Each of networks 14a through 14d are coupled to the bridge 12 using conventional networking protocols known in the art, including ethernet and/or token-ring, for example.

The bridge further includes operating therein a bridging module 18 coupled to a filtering module 20, each operatively coupled for communication to the ports (16 through 16d). The bridge module 18 forwards packets from a source network to a destination network according data in a bridge table 22. As described above, the bridge table 22 includes a mapping for MAC address to destination port. The bridge module 18 uses the data in the bridge table 22 to forward a packet to the appropriate network. The processes of the bridge module are further described below in conjunction with FIG. 4.

The filter module 20 allows or disallows broadcast flooding by the bridge module 18 according to the algorithm of the present invention. In general for a given MAC address, the filter module 20 permits broadcast flooding of related packets for a limited time period to allow the mapping of the MAC address to a port as described above. If after this limited time period, the bridge 12 is unable to establish this mapping (e.g., the destination node fails to reply), the filter module 20 disallows broadcast flooding of further related packets for a second limited time period. After this second time period expires, the filter module 20 repeats the process allowing the bridge 12 to establish the mapping for the MAC address again. The first limited time period for flooding and the second limited time period for non-flooding may be configured by an administrator of the bridge to optimize the performance of the bridge. The filter module 20 and its operation are described more fully below in conjunction with FIG. 2 through FIG. 6.

Referring now to FIG. 2, there is shown is a functional block diagram of a filtering module 20. The filtering module 20 is normally embodied in a software application executed by the bridge 12. The filtering module 20 comprises a flood control unit (FCU) 28 and a filter table 30.

The FCU 28 manages the filter table 30 and communicates with the bridging module 18 to allow or disallow broadcast flooding. For example, when the bridging module 18 processes a packet and determines that a matching entry is not found in the bridge table 22, the bridging module 18 passes the packet to the FCU 28 for further processing. In contrast, prior art bridging implementations would simply broadcast the packet to each port, except the originating port as is known in the art. When the FCU 28 receives the packet from the bridging module 18, the FCU 28 checks the bridge table 30 to determine if the MAC address associated with the packet is authorized for flooding or unauthorized for flooding. For each MAC address processed by the FCU 28, the FCU 28 cycles between periods of allowed broadcast flooding and periods of disallowed broadcast flooding ("quiet time"). An administrator of the bridge may adjust the periods of flooding and quiet time according to the demands of the bridged network.

The FCU 28 adds and removes entries from the filter table 30 during operation. An entry is added when a new MAC address is processed by the FCU 28 (i.e., when a packet having a new MAC address not in the filter table 30 is passed from the bridging module to the FCU 28). While the MAC address is resident in the filter table 30, the FCU 28 cycles between flooding and quiet time periods, and broadcasts packets directed at the MAC address during the allowed flooding time periods. Once the destination node having the MAC address replies to a packet, its port identity is established, and thus a mapping from MAC address to port is established in the bridge table 22. The associated entry for the MAC address is deleted from the filter table 30 once this mapping has been established.

FIG. 3 depicts an illustrative data structure 32 suitable for use with the filter table 30. Filter table structure 32 is depicted as a conventional row-column table, however, other data structures may also with the invention including a tree structure, for example.

Filter table structure 32 includes five fields, identified as an "address" field 34, a "packet count" field 36, a "flooding timer" field 38, a "quiet flag" field 40, and a "restart timer" field 42. Filter table structure 32 also includes one or more rows 44, each for storing entries associated with a MAC address processed by the FCU 28.

Address field 34 contains the MAC address processed by the FCU 28. As noted above, entries are added as the FCU 28 processes a new MAC address. Other packets directed at the same MAC address are not added as new entries but rather are identified with the existing entry. Entries are deleted when a reply is received from the MAC address identified in address field 34, as described above.

The packet count field 36 identifies the number of packets processed by the FCU 28 directed at the MAC address. When a first packet is received for a corresponding MAC address, this value is set to one (1). As further packets directed at the MAC address are received, the value in the packet count field 36 is incremented. This value may be used to determine which existing entry to delete from the filter table 30 when the filter table 30 has been overpopulated with other entries.

The flooding timer field 38 is used for setting the period for allowed broadcast flooding for packets associated with a corresponding MAC address. This field is commonly tied to a timing module (not shown) in the bridge 12. In operation, the value in this field is initially (set/reset) to a predetermined value (or as configured by an administrator of the bridge 12), and is decremented over time. The duration specified for the flooding timer 38 is a limited time period during which broadcast flooding is permitted for packets corresponding to the MAC address. Once the limited time period (threshold) has elapsed, normally indicated when the flooding timer field 38 has been decremented to zero (0), broadcast flooding is not allowed for a second limited time period. It is noted that an incrementing scheme may be used as an alternative to the decrementing scheme described herein.

Once the flooding timer 38 has expired/elapsed, the quiet flag 40 is set to "on" or "1" to indicate that broadcast flooding is currently disallowed. Initially the flooding timer field 38 is set to "off" or "0" to indicated broadcast flooding is permitted. During operation this field may be toggled "on" or "off" by the FCU 28 depending on whether broadcast flooding is allowed or disallowed.

Once the quiet flag 40 is set to "on" (to indicate no broadcast flooding), the restart timer field 42 is set/reset to a predetermined value (or as configured by an administrator of the bridge 12), and is decremented over time, similar to the flooding timer field 38. The duration specified for the restart timer 42 is a limited time period during which broadcast flooding is disallowed for packets corresponding to the MAC address. Once this limited time period (threshold) has elapsed, normally indicated when the restart timer field 42 has been decremented to zero (0), broadcast flooding is re-enabled for another period. The quiet flag 40 is reset (set to the "off" state) and the flooding timer 38 is reset for another period.

In the present illustrative embodiment, the FCU 28 carries out broadcast flooding in the appropriate time period. In an alternative embodiment, the FCU 28 can authorize and/or deny broadcast flooding by the bridging module 18 in the appropriate time period. In yet another alternative embodiment, a communication module (not shown) operatively coupled to the FCU 28 and the ports (16a through 16d) may be used to carry out the broadcast flooding as authorized by the FCU 28.

The method and operation of invention will be more fully understood with reference to the flow charts of FIG. 4 through FIG. 6, as well as FIG. 1 through FIG. 3. The order of actions as shown in FIG. 4 through FIG. 6 and described below is only exemplary, and should not be considered limiting.

Referring now to FIG. 4, as well as FIG. 1 through FIG. 3, there is shown a flow chart depicting the acts associated with bridge module 18 processes in accordance with the present invention. The process described herein is carried out for each packet received by the bridge module 18.

At box 100, the bridging module 18 receives a packet transmitted from a node on one of the networks (14a through 14b). For example, a packet transmitted by node 1 (24a) on network 1 (14a) would be received by bridging module 18 via port 1 (16a). Box 110 is then carried out.

At box 110, the bridging module 18 inspects the packet and determines the destination MAC address from the header portion of the packet. This MAC address information is then checked against entries in the bridge table 22 to determine whether a port is mapped to this MAC address. Diamond 120 is then carried out.

At diamond 120, the bridging module 18 determines whether a matching entry in the bridge table 22 exists for the MAC address inspected in box 110. If a matching entry exists, box 130 is then carried out. Otherwise, process 140 is carried out.

At box 130, a matching entry in the bridge table 22 has been found for the MAC address intercepted. The matching entry indicates, among other things, the port mapped to the MAC address. For example, a MAC address mapping for node 2 (24b) in network 4 (14d) may be designated as port 4 (16d). Accordingly, the bridge module 18 forwards the packet to the appropriate port (and thus the appropriate network).

At process 140, a matching entry in the bridge table 22 has not been found for the MAC address. Thus, the bridging module 18 does not know which port to forward the packet. Accordingly, the invention provides a flood control process for managing broadcast flooding for the purpose of ascertaining the port associated with the destination MAC address. This process is described in further detail below in conjunction with FIG. 5. In general, the filtering module 20 allows broadcast flooding for a first limited period of time, and then disallows broadcast flooding for a second limited period of time. This cycle is then repeated, as needed and as described further below.

Referring now to FIG. 5, as well as FIG. 1 through FIG. 4, there is shown a flow chart depicting the acts associated with the flood control process (process 140 of FIG. 4) in accordance with the present invention.

At process 200, the flood control process begins, normally as required when called from diamond 120 of FIG. 4. The bridging module 18 passes the current packet to the filtering module 20, indicating, among other things, the MAC address associated with the packet. Diamond 210 is then carried out.

At diamond 210, the FCU 28 of the filtering module queries the filter table 30 to determine whether the MAC address has an associated existing entry or whether a new entry is required for the MAC address. For example, a packet directed at a particular MAC address may have been previously processed by the FCU 28, in which case an entry for the MAC address may be resident in the filter table 30. Packets related to the same MAC address are not designated a new entry in the filter table 30, but rather are associated with the existing entry for the same MAC address. It is noted that entries may be deleted during operation for a plurality of reasons. As such, some entries which were previously associated with a corresponding MAC address may no longer be resident in the filter table 30. In this case, a new entry in the filter table 30 is created. If the MAC address currently under consideration is not associated with an existing entry in the filter table, a new entry is required and process 220 is then carried out. Otherwise, box 290 is carried out.

Process 220 describes the acts associated with creating a new entry in the filter table 30 for the current MAC address and is described more fully below in conjunction with FIG. 6. After the new entry is created, box 230 is then carried out.

At box 230, the packet is broadcast to each port of the bridge (except the originating port). For example, if the packet is received from port 1 (16a), the packet is broadcast to port 2 through 4 (16b through 16d) of bridge 12. Diamond 240 is then carried out.

At diamond 240, a determination is made whether a reply is received from the node having the destination MAC address under consideration. This determination is normally made by the FCU 28, but can alternatively be made by the bridging module 18 or another communication module (not shown). If a reply is received from the destination MAC address, box 260 through 280 are carried out. Otherwise box 250 is carried out.

At box 250, the current flood control process is completed. Control is returned to further bridge processing. It is noted that processes (both bridging and flood control) may be carried out in parallel as is know in the art, and thus several instances of one or more of the processes described herein may be carried out simultaneously.

At box 260, a reply has been detected from the destination MAC address. Such reply will originate from the port associated with the destination MAC address. For example, if node 2 (24*b*) in network 4 (14*d*) replies to particular request, the bridge 12 will detect this reply on port 4 (16*d*). This port 4 (16*d*) will be mapped to the MAC address entry for node 2 (24*b*) in the bridge table 22. Box 270 is then carried out.

At box 270, the reply is forwarded to the appropriate port, if necessary, and according to the existing implementations. Box 280 is then carried out.

At box 280, the entry associated with the MAC address is removed from the filter table 30. Since a bridge table mapping has been defined, further broadcast flooding will not normally be required for the particular MAC address, unless the bridge table 22 mapping is later removed. As is known in the art, the entries in the bridge table 22 may be removed for a variety of reasons, including, for example, when the node having the MAC address fails to responds after a defined timeout period. Box 250 is then carried out.

At box 290, the query in diamond 210 determined that the MAC address currently under consideration is associated with an existing entry in the filter table 30. Accordingly, the packet count field 36 for this existing entry is incremented to reflect that another packet has been directed to the corresponding MAC address. Diamond 300 is then carried out.

At diamond 300, the FCU 28 checks the quiet flag field 40 for the entry associated with the MAC address in the filter table 30 to determine its state. If the quiet flag 40 is set to "on" or "1", then diamond 340 is carried out. Otherwise, the quiet flag is disable or "off" ("0"), and diamond 310 is carried out.

At diamond 310, FCU 28 has determined from the query of diamond 300 that the quiet flag field 40 is "off" or disabled. This state indicates that broadcast flooding to the MAC address is currently permissible, if the flooding timer has not expired. The FCU 28 checks the flooding timer field 38 to determine whether the limited time for flooding has expired. As described above, the flooding timer may indicate expiration when its value has reached a certain threshold, which in the present example occurs when the flooding timer field 38 has been decremented to 0 from its initial value. If the flooding timer 38 is expired, broadcast flooding is disallowed and box 320 is carried out. Otherwise, broadcast flooding is allowed and box 230 is then carried out.

At box 320, the flooding timer has expired and broadcast flooding is currently disallowed. The quiet flag field 40 is set to the "on" or "1" position to indicate that packets directed to the corresponding MAC address are not currently permitted. Box 330 is then carried out.

At box 330, the FCU 28 resets the reset timer field 42 to a predetermined value (or a value specified by an administrator of the bridge 12). As described above, the reset timer field 42 defines a limited time period during which broadcast flooding is not permitted. In the present example, a timing module (not shown) decrements this value during operation, and when the restart timer value reaches a threshold ("0", in this case), the FCU 28 restarts the cycle of allowed limited broadcast flooding again (see diamond 340 through box 360, below). As noted above, the present invention may alternatively be used with a timing module that increments, rather than decrements the timer fields (38, 42) to reach the defined threshold value. Process 250 is then carried out.

At diamond 340, the FCU 28 has determined from the query of diamond 300 that the quiet flag field 40 is "on". This indicates that broadcast flooding to the MAC address is not currently permissible, unless the restart timer has expired. Once the restart time has expired, the limited time for disallowed flooding is expired, and the cycle for limited broadcast flooding is repeated. The FCU 28 checks the restart timer field 42 to determine whether the limited time for disallowed flooding (quiet time) has expired. As described above, the restart timer 42 may indicate expiration when its value has reached a certain threshold, which in the present example occurs when the restart timer field 42 has been decremented to 0 from its initial value. If the restart timer 42 is expired, broadcast flooding is allowed and box 350 is carried out. Otherwise, broadcast flooding is not allowed and process 250 is then carried out.

At box 350, the restart timer field 42 has expired, and the cycle for limited broadcast flooding is repeated. Accordingly, the quiet flag is reset or otherwise set to the "off" or "0" state. The "off" state indicates that broadcast flooding is currently permitted. Box 360 is then carried out.

At box 360, the FCU 28 resets the flooding timer field 38 to its initial (or administrative assigned) value. This value for the flooding timer field 38 provides a limited time period during which broadcast flooding to the MAC address is permitted. The flooding timer field 38 is decremented during operation by a timing module (not shown) and when its value reaches a threshold value ("0", in the present example), the limited period for disallowed broadcasting begins. Box 230 is then carried out to forward the current packet inspected.

Referring now to FIG. 6, as well as FIG. 1 through FIG. 5, there is shown a flow chart depicting the acts associated with adding a new entry into the filter table 30 in accordance with the present invention. The process described herein is carried out during process 220 of FIG. 5.

At box 400, the FCU 28 determines whether an existing entry in the filter table is first removed before adding a new entry. A plurality of factors may be used to determine whether this act is carried out, including for example, size of the filter table 30, the capabilities of the processor and/or memory of the bridge device 12, the type of communication associated with the entry to be deleted, among others. In general, a existing entry is deleted when a failure to do so would adversely affect the overall performance of the bridge 12 if a new entry were to be added to the filter table 30. Box 410 is then carried out.

At box 410, the FCU 28 adds a new entry (or record) to the filter table 30 for the current MAC address. The MAC address is stored in the address field 34. Box 420 is then carried out.

At box 420, the packet count field 36 for the new entry is set to "1" to indicate that a first packet has been directed at the MAC address. As described above, this field is incremented during operation as additional packets are directed to the MAC address. Box 430 is then carried out.

At box 430, the flooding timer field 38 is set to a predefined (or administrative-assigned) value. This value indicates the limited time period during which broadcast flooding is permitted. A timing module (not shown) decrements this value in operation until a threshold value is reached ("0", in this example) at which point the limited period for broadcast flooding is expired and a second limited period for disallowed flooding begins. As described above, the initial value of the flooding timer 38 may be alternatively set to "0" and the timing module would increment the flooding timer 38 until a threshold value is reached. After box 430 is carried out, processing is returned to box 230 of FIG. 5.

Accordingly, it will be seen that this invention provides a method and apparatus for controlling flooding in a bridged network. Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method for controlling flooding in a bridged network having a bridge connected to a plurality of networks, the method comprising:
    passing a packet to a filtering module, and indicating a MAC address associated with the packet to the filtering module;
    determining whether the received MAC address exists in a table or needs to be added as an entry to the table;
    if the MAC address already exists in the table then incrementing a packet count field, the packet count field associated with the MAC address already existing in the table and indicating how many packets have been sent to the MAC address;
    if a quiet flag associated with the MAC address is not set to true within the table and a flooding timer associated with the MAC address has not expired, the flooding timer initially set to a first predetermined value and decremented periodically, then broadcasting the received packet to a plurality of interfaces; and
    if the quiet flag associated with the MAC address is set within the table and a restart timer associated with the table has expired, the restart timer initially set to a second predetermined value and decremented periodically, then;
        resetting the quiet flag in the table to false; and
        setting a flooding timer to an initial value; and broadcasting the received packet to a plurality of interfaces.

2. The method of claim 1, wherein said first predetermined value and said second predetermined value are set by a network administrator.

3. The method of claim 1, wherein, an entry is made in the table if no mapping between the MAC address and a port exists.

4. The method of claim 3, wherein the entry is removed from the table after a port associated with the destination MAC address replies to the broadcast flooding of packets.

5. The method of claim 1, wherein an entry is made in the table indicating a number of packets that are directed at the destination MAC address.

6. The method of claim 5, wherein the entry indicating the number of packets directed at a destination address is used to determine which entry to delete from the table if the table becomes overpopulated with entries.

7. A computer program product containing instructions which, when executed by a computer, controls flooding in a bridged network having a bridge connected to a plurality of networks, by:
    passing a packet to a filtering module, and indicating a MAC address associated with the packet to the filtering module;
    determining whether the received MAC address exists in a table or needs to be added as an entry to the table;
    if the MAC address already exists in the table then incrementing a packet count field, the packet count field associated with the MAC address already existing in the table and indicating how many packets have been sent to the MAC address;
    if a quiet flag associated with the MAC address is not set to true within the table and a flooding timer associated with the MAC address has not expired, the flooding timer initially set to a first predetermined value and decremented periodically, then broadcasting the received packet to a plurality of interfaces; and
    if the quiet flag associated with the MAC address is set within the table and a restart timer associated with the table has expired, the restart timer initially set to a second predetermined value and decremented periodically, then:
        resetting the quiet flag in the table to false; and
        setting a flooding timer to an initial value; and broadcasting the received packet to a plurality of interfaces.

8. The computer program product of claim 7, wherein said first predetermined value and said second predetermined value are set by a network administrator.

9. The computer program product of claim 7, further comprising instructions which, when executed by a computer, insert an entry in a table if no mapping between the MAC address and a port exists.

10. The computer program product of claim 9, further comprising instructions which, when executed by a computer, remove the entry from the table after a port associated with the MAC address replies to the broadcast flooding of packets.

11. The computer program product of claim 7, further comprising instructions which, when executed by a computer, make an entry in the table indicating a number of packets that are directed at the destination MAC address.

12. The computer program product of claim 11, further comprising instructions which, when executed by a computer, examine the entry indicating the number of packets directed at a destination address to determine which entry to delete from the table if the filter table becomes overpopulated with entries.

* * * * *